Dec. 24, 1968 M. E. HUMPHREY 3,418,637
DIGITAL PHASE LOCK CLOCK
Filed May 27, 1966
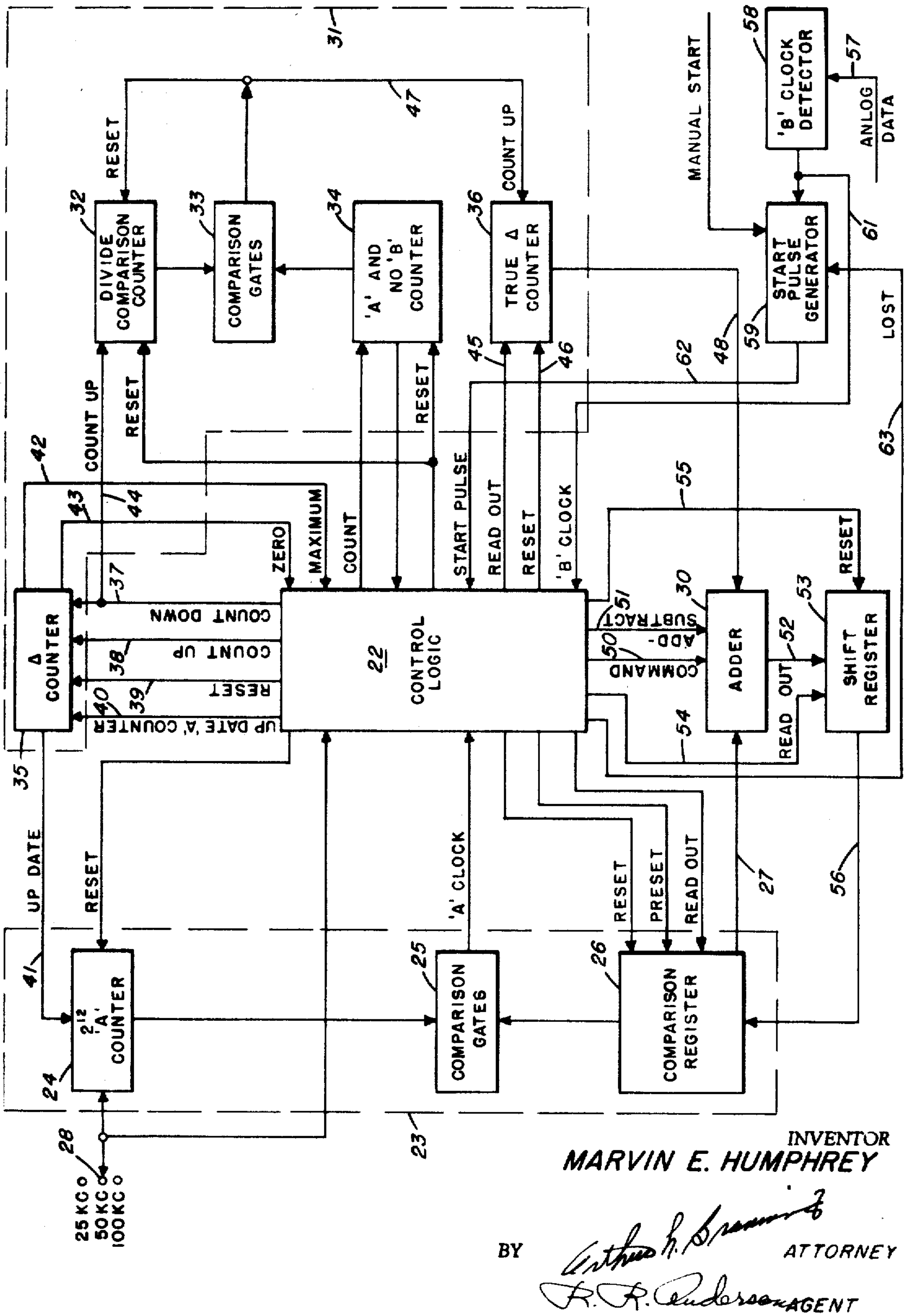
INVENTOR
MARVIN E. HUMPHREY
BY Arthur L. Branning ATTORNEY
R. R. Anderson AGENT United States Patent Office 3,418,637

Patented Dec. 24, 1968

3,418,637

DIGITAL PHASE LOCK CLOCK

Marvin E. Humphrey, Alamogordo, N. Mex., assignor, by mesne assignments, to the United States of America as represented by the Secretary of the Navy Filed May 27, 1966, Ser. No. 554,643
8 Claims. (Cl. 340—172.5)

ABSTRACT OF THE DISCLOSURE

A digital phase lock clock for use with data processing equipment. An internal clock is compared, both as to phase and frequency, with an external clock which is used as a standard. The logic contained in the system will detect the different conditions of frequency and phase present in the internal clock and will make the necessary corrections so that the internal clock will remain locked in frequency and phase with the external clock or standard.

The present invention relates to a synchronization system to be used with data processing systems and more particularly to a digital phase lock clock which will remain in phase and on frequency.

As is well known among those skilled in the electronics arts a number of related problems need to be resolved before intelligence in the form of modulated carrier signals can effectively be transmitted between two separated locations as, for example, in transmitting and receiving telemetered data. One of these problems is that of carrier lock wherein it is necessary to make the frequency, or frequency and phase, of the carrier signal locally generated at the receiver identical with that of the carrier component of the transmitted signal. Another problem area is that of synchronizing the various circuits of the receiver apparatus so that they may respectively be rendered operable at the proper times. As for the second problem, the need for synchronization becomes singularly important where digitalization techniques are utilized because it then becomes necessary to gate "On" various receiver circuits at the right moment in order to pass the pulsed information for further processing, which is to say that effective system operation depends upon proper synchronization.

When both problems have to be met, it is customary to transmit an unmodulated RF carrier which is used as a reference against which the locally generated carrier is compared. Next a synchronizing signal is transmitted which may be nothing more than a coded arrangement of pulses. However, these pulses are used at the receiver station to advance or retard the time of occurrence of locally generated pulses until they ultimately occur at the right moments. It is these latter pulses that are used in the receiver equipment to synchronize the operation of its various parts.

From the above discussion it is apparent that a clock which will remain in phase and on frequency has been a major problem in handling pulsed amplitude modulated data, such as that used in the telemetering art. Systems employed in the past have utilized gated oscillators, but these systems have proved to be inadequate due to the frequency shift of the incoming data. These shifts have been found to be due to speed variations in both the record and reproduce tape transports.

In the present invention the internal clock, or the one at the data processing receiver, will be called the A clock, and the external clock or the one at the data transmitting position will be called the B clock. The A clock can be (1) on frequency but out of phase with the B clock; (2) off frequency and out of phase; (3) off frequency and in phase; (4) on frequency and in phase. The logic contained in the system will detect the different conditions of frequency and phase present in the data processing operation and will make the necessary corrections so that the A clock will remain locked in frequency and phase with the external or B clock.

An object of the present invention is to provide a digital phase lock clock.

Another object of the invention is to provide a phase lock clock which will remain in phase and on frequency with another or standard clock.

Still another object of the invention is to provide a phase lock clock wherein various conditions of phase and frequency are sensed and corrections are made when there are deviations from the standard clock.

Other objects, advantages and novel features of the invention will become apparent from the following detailed description of the invention when considered in conjunction with the accompanying drawings wherein:

FIG. 1 is a block diagram of the synchronizing system making up the clock in the present invention.

Referring now to the single sheet of drawings there is shown in FIG. 1 a diagram of the components making up the invention. The most important element is control logic 22, which may be any well known comparator circuit that checks one potential against another, and if there is a difference, or error voltage between the two, then this error voltage is utilized to correct for the error or is applied to some form of utilization circuit, as desired.

Shown generally as 23 is an A clock generator which produces the A clock pulse and which is composed of a $2^{12}$ counter 24, a comparison gate 25, and a comparison register 26. The $2^{12}$ counter 24 has an input terminal 28 upon which may be impressed a 25 k.c., 50 k.c., or 100 k.c. signal, for example, depending upon the frequency at which the system is operating. The $2^{12}$ counter consists of a plurality of flip-flop circuits which are activated in sequence, upon receipt of successive pulses, to register a binary count. An output from comparison register 26 is fed over lead 27 to an adder 30, as will be described further, hereinafter.

Making up a divider arrangement, and shown generally as 31, is a divide comparison counter 32, a comparison gate 33, an "A and No B" counter 34, a Δ counter 35, and a true Δ counter 36. The Δ counter 35 receives a number of control signals from control logic 22 by means of the plurality of leads 37, 38, 39, and 40, while output signals are fed from Δ counter 35 over lead 41 to the $2^{12}$ counter 24, and back to control logic 22 over leads 42 and 43. The control signal being fed over lead 37 branches off to lead 44 and serves as an input to divide comparison counter 32. True Δ counter 36 has several inputs applied to it, such as those over leads 45 and 46 from control logic 22, and that from comparison gate 33 over lead 47. The output from true Δ counter 36 is fed via lead 48 to adder 30.

An adder circuit 30, in addition to having inputs applied via leads 27 and 48, also receives control signals from control logic 22 over leads 50 and 51. The output from adder 30 is fed via lead 52 to a shift register 53 which also has signal inputs from control logic 22 by means of leads 54 and 55. The output of shift register 53 is fed over lead 56 to comparison register 26.

The B clock pulses are inserted into the system over lead 57 which is connected to a B clock detector 58, this component being connected in turn to a start pulse generator 59 which functions to start operation of the system upon receipt of the required number of B clock pulses, as will be more fully explained later. The B clock pulses, in addition to being fed into start pulse generator 59, are tapped off by lead 61 and inserted into control logic 22. The output of start pulse generator 59 goes to control logic 22 by means of connection 62, while a stop pulse is returned to pulse generator 59 over connection 63 when conditions require it.

Before moving on to the overall operation of the entire system, let us look briefly at the specific function of several of the individual components. The $2^{12}$ counter 24, comparison gate 25, and comparison register 26, along with the 50 kc. input at input terminal 28 comprise the A clock generator. When the $2^{12}$ counter 24 registers the same count as that in the comparison register 26, a pulse is generated. This is the A clock pulse, which resets the $2^{12}$ counter 24 so that counting starts again. By controlling the binary number in the comparison register 26 it is possible to control the A clock pulse period in 20 microsecond increments. The manner in which the comparison register 26 is controlled will be discussed in detail later.

The "A and No B" counter 34 registers the number of times an A clock is present and the B clock is absent. If a one to one comparison existed there would be no need for this unit. The capacity of the counter is 255.

The Δ counter 35 has three functions. The first is to determine the time between the A and B clocks (if any) in 20 microsecond increments. The second function is to serve as one of the elements making up divider 31. The third function is to update the $2^{12}$ counter 24, via lead 41, when A lags B.

The divider 31 is, as has been described above, composed of divide comparison counter 32, comparison gate 33, the "A and No B" counter 34, the Δ counter 35, and the true Δ counter 36. The function of the divider 31 is to determine the true Δ, which is the time differential between the present A clock period and what it should be. The true Δ is the Δ counter 35 divided by the "A and No B" counter 34.

The control logic 22 is the heart of the system for its function is to control all arithmetic operations which go into keeping the A clock on frequency and in phase with the B clock.

Let us turn now to the operation of the entire unit. Under ideal conditions the A and B clocks should always occur together, but in most situations the A will lead, occur with, or lag the B. Also as stated before the B clock is not always present; in fact, it is seldom present.

Let us assume that everything is in phase and on frequency. If there then should be any frequency variation in the B, then the A clock frequency will have to change too, and by a like amount. Assume that A leads the B, as determined by control logic 22, then the A frequency is too high. If A lags the B, as determined by control logic 22, then the A frequency is too low. If A leads or lags B and at the same time true Δ is zero, then the frequency is correct and only phase correction need be made.

If a frequency change is necessary, then control logic 22 will command the "read in" of the comparison register 26 via lead 27 and true Δ counter 36 via lead 48 into the adder 30. If A occurred after B control logic 22 will set the adder 30 to subtract, via lead 51. If A occurred before B control logic 22 will set the adder 30 to add, via lead 51. Thus the adder 30 will operate to add to or subtract from the amount which was present in the comparison register 26 the amount present in the true Δ counter 36, to provide a corrected amount. The output of adder 30 is now placed, over lead 52, into shift register 53 so that control logic 22 can "read out," by means of lead 54, the new comparison number from shift register 53, over lead 56, back into the comparison register 26.

The control logic 22 makes a phase correction in the following manner. If the A clock leads the B clock, then $2^{12}$ counter 24 is reset at B clock time. If A lags B then the count accumulated in Δ counter 35 is forced into the $2^{12}$ counter 24 at A clock time, which is possible since Δ counter 35 and the $2^{12}$ counter 24 are both counting at the 50 kc. rate. For example, if the A clock lags by 20 counts, then at A clock time the $2^{12}$ counter 24 is reset and then forced to a count of 20, which reestablishes the phase relation with the B clock. It should be noted, of course, that if there was any accumulated count in the true Δ counter 36 during this time, that would indicate that the A clock was also off frequency with the B clock, in addition to being out of phase.

When any clock occurs the Δ counter 35 is allowed to count, unless the A clock and B clock occur simultaneously. If the starting clock was A, then the Δ counter 35 will be stopped by one of two events; either by the B clock, or by the Δ counter reaching a maximum. If the maximum is reached, then the "A and No B" counter 34 is indexed by one. If the B clock stops the Δ counter then the dividing process begins, the division being necessary to determine the true one period time difference. If the detected time difference is divided by the number of clock pulses since the last correcting, the number produced will be the time error of one period, which is called true Δ. This error is then added or subtracted, as the case dictates, to the comparison register 26. If B occurs and the Δ counter 35 reaches a maximum, then the unit is lost and returns itself to the start mode.

When the command is given by control logic 22 to divide, the Δ counter 35 is switched, by means of lead 37 to become a down counter and the 50 kc. signal gates into it. The output of this gate also is allowed, over lead 44, to count the divide comparison counter 32 whose reset point is controlled by the "A and No B" counter 34. Every time the divide comparison counter 32 is reset, the true Δ counter 36 is indexed by one, and this process continues until the Δ counter 35 is zero. As an example, if "A and No B" counter 34 equals 36, and the Δ counter 35 equals 122, the divide comparison counter 32 will count up to 36 and be reset 3 times before the Δ counter is zero which gives a true Δ counte of 3. Since all decimal points are discarded, this 3 indicates that the error per clock was 3 counts (60 microseconds) and the A clock comparison register 26 should be changed by 3. The entire divider 31 is reset at system start when the Δ counter 35 reaches zero. The zero detect gate, within the counter, tells the control logic 22, via connection 43, that the division process is complete and to update the A clock comparison register 26 as has been described before.

When in the start mode the unit requires that all B clock pulses be used, but this makes the unit susceptible to the inherent jitter of the clocked detection logic. This jitter is approximately 100 microseconds for a 10.5 kc. subcarrier, thereby producing an error of 5 counts when counting at a rate of 50 kc. These 5 counts would then be added or subtracted, as the case may be, to the A clock comparison register 26 to correct for the error. This jitter could also cause a frequency change in the A clock, so in order to minimize the error, when the start mode is initiated the B clock pulses are inhibited until eight A clock pulses have been generated. The next B clock pulse will pass and the inhibit is again activated for eight more A clock periods. By doing this the jitter only effects phase and not frequency.

Assume that the unit is operating on frequency and eight A clock periods have passed. Also assume that there is a jitter which delays the B clock by 100 microseconds. The Δ counter 35 will detect a difference of five which is then divided by the "A and No B" counter 34, which is eight. The resulting quotient, or true Δ, is zero thereby nullifying the effect of the jitter on the A clock frequency.

Starting the unit is accomplished by receiving two B clocks in succession, and necessary logic is included to accomplish this. All B clocks are assumed good and are sent into the system as a start pulse, and if another B clock is not received one clock period later, then the next B clock is sent into the system as a start pulse. When the second B is received at the predicted time no more start pulses are sent, and the system is now operating.

While the present invention as described was designed to be used for PAM, it could easily be adapted to PCM as well. The only change necessary would be to the start logic and crossover detection logic. When used with either the PAM or PCM it appears that the count rate of the $2^{12}$ counter 24 should be $1 \times 10^3$ times greater than one clock period. A lower count rate can be used but the number of clock periods between correction pulses is decreased.

It should be noted that the entire discussion of this unit was with 50 kc. as a count frequency. This frequency was selected because the data which the unit was to handle had a clock rate of 50 c.p.s., and with 50 kc. as the count frequency, the time increment would be 20 microseconds. If desired, a higher count frequency may be used, and in many ways it would be better, because the higher frequency decreases the time increment between counts, and therefore results in less drift per cycle.

From the above description it is clear that the present invention offers a new and improved phase lock clock which will automatically remain in phase and on frequency with an external clock or other frequency standard. Any deviations of either phase or frequency are sensed by the device and compensations for these deviations are made automatically.

Obviously many modifications and variations of the present invention are possible in the light of the above teachings. It is therefore to be understood that within the scope of the appended claims the invention may be practiced otherwise than as specifically described.

What is claimed is:

1. A phase lock clock for use in data processing systems comprising a control means;

a first counter for registering pulses from an external clock serving as a calibration standard;

a second counter for receiving input pulses and serving as an internal clock generator;

comparator means for comparing the second counter with the first counter to determine any phase difference between said counters;

means responsive to the control means for resetting the second counter to correct for said phase difference;

a divider system to determine any frequency difference between the first and second counters; and means responsive to the control means for resetting the second counter to correct for said frequency difference whereby the second counter will remain locked with the first counter in both frequency and phase.

2. The phase lock clock as described in claim 1 further including a difference counter connected to the control means wherein the control means receives the outputs from the first counter, the second counter, and the difference counter in order for it to activate the means correcting for phase difference and the means correcting for frequency difference.

3. The phase lock clock as described in claim 2 wherein said second counter can receive pulses to a magnitude of $2^{12}$.

4. The phase lock clock of claim 3 wherein the comparison means includes an adder;

a shift register connected to said adder; and a comparison register connected to the shift register.

5. The phase lock clock of claim 4 wherein the means for correcting phase difference consists of a Δ counter which forces into the second counter a sufficient number of pulses to advance the second counter into phase with the first counter if the second counter lags the first counter, or resets the second counter to agree with the first counter if the second counter leads the first counter.

6. The phase lock clock of claim 5 wherein the divider system for determining frequency difference between the first and second counters includes a true difference counter whose count is found by dividing the detected time difference between the first and second counters by the number of pulses received since the last correction was made.

7. The phase lock clock of claim 6 wherein the divider system consists of a Δ counter, a divide comparison counter, comparison gates, a true Δ counter, and a counter which is activated whenever the second counter functions and there is no count from the first counter.

8. The phase lock clock of claim 7 wherein the second counter which serves as an internal clock generator consists of a $2^{12}$ counter, comparison gates, and a comparison generator.

References Cited

UNITED STATES PATENTS

| | | | |
|---|---|---|---|
| 2,949,228 | 8/1960 | Bailey et al. | 235—92 |
| 2,979,565 | 4/1961 | Zarcone | 178—50 |
| 3,126,475 | 3/1964 | Coddington et al. | 235—160 |
| 3,265,867 | 8/1966 | Venn et al. | 235—92 |

PAUL J. HENON, *Primary Examiner.*

R. RICKERT, *Assistant Examiner.*